Figure 1:
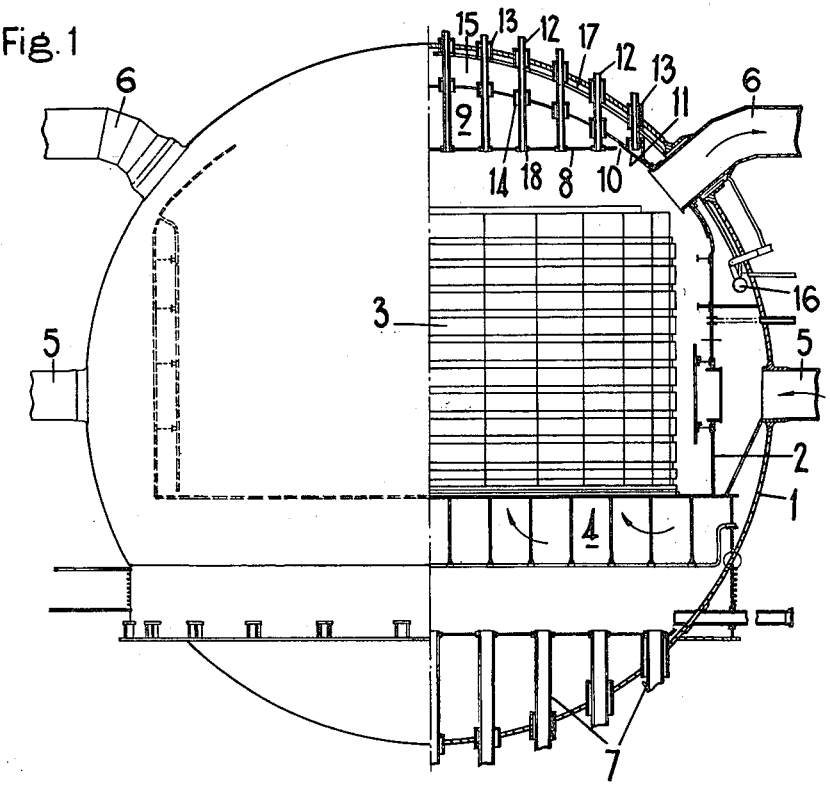

INVENTORS
GEOFFREY HERBERT HAINES
PETER JOHN GRANT
BY Kirschstein, Kirschstein & Ottinger
ATTORNEYS

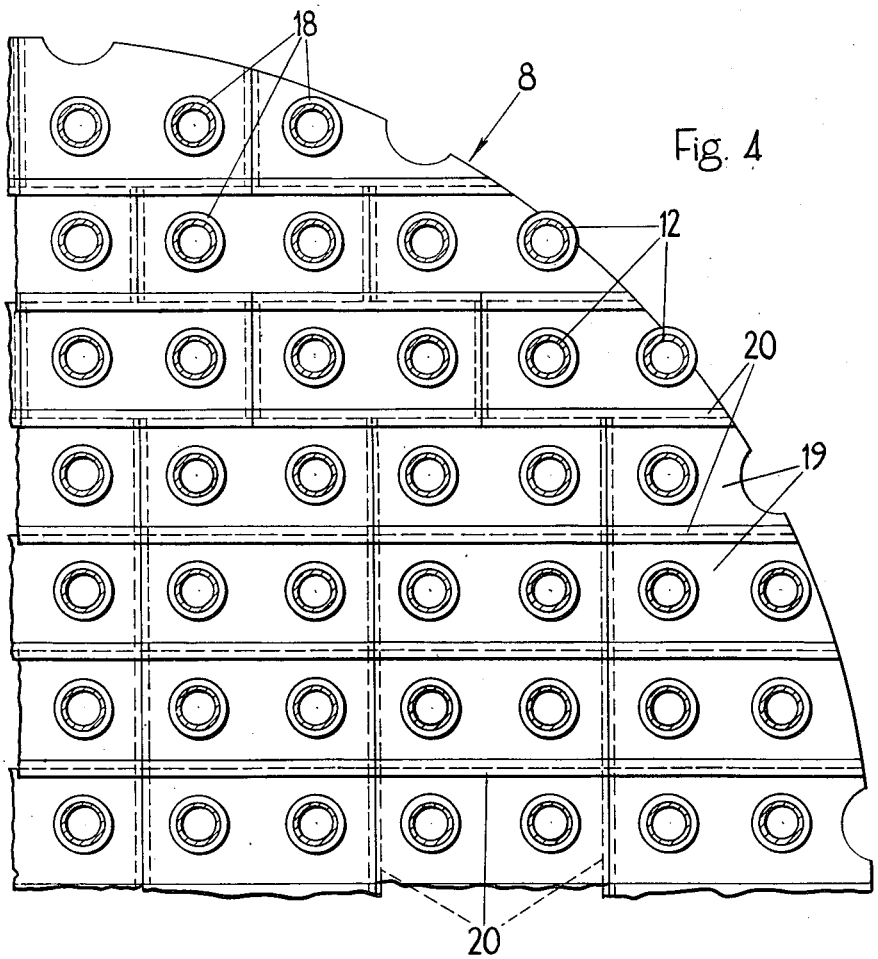

United States Patent Office 3,140,982
Patented July 14, 1964

3,140,982
THERMAL REACTORS
Geoffrey Herbert Haines, Upminster, and Peter John Grant, Claygate, England, assignors to The General Electric Company Limited, London, England
Filed Aug. 26, 1960, Ser. No. 52,135
Claims priority, application Great Britain Sept. 27, 1956
4 Claims. (Cl. 176—58)

The present invention relates to nuclear reactors and is particularly concerned with gas-cooled nuclear reactors of the kind having within an enclosing pressure vessel a core including moderating material and formed with vertically extending channels for the reception of fuel elements, and for the throughflow of gaseous cooling medium. This application is a continuation-in-part of our copending application (now abandoned) Serial No. 686,201, filed September 25, 1957, and entitled "Thermal Reactors."

In a nuclear reactor of this kind the enclosing pressure vessel is of necessity subjected to arduous operating conditions due to the high operating temperature. In particular, it has been found that upper end of the pressure vessel above the upper ends of said channels is subjected to very severe thermal stresses arising from the combined action of impinging gas streams and beams of neutrons emanating from said channels. In copending application Serial No. 588,406, now Patent 2,997,435, dated August 22, 1961 it is proposed to construct the pressure vessel of a nuclear reactor in the form of two shells one within the other, the inner shell forming, as it were, a heat resistant lining spaced from the outer shell and arranged so that a cooling gas can flow through the space between the two shells. One object of the present invention is to provide a protective shielding arrangement, which can be used as an alternative, or in addition, to the double shell arrangement referred to above, whereby to protect the pressure vessel from damage due to the severe operating conditions.

Another object of the present invention is to provide a protective shield structure for use in a gas-cooled nuclear reactor, which is of light construction and which is effective to protect the pressure vessel from the combined action of hot gas streams and neutron beams.

Yet another object of the present invention is to provide a protective shield structure for use in a gas-cooled nuclear reactor, and an improved method of supporting said structure within a pressure vessel.

It is to be understood that the present invention is not concerned with the general problem of neutron shielding, or with gamma-ray shields or biological shields; the invention is merely concerned with a shielding arrangement for protecting localised areas of the pressure vessel of a gas-cooled nuclear reactor from damage due to the combined action of hot gas streams and neutron beams.

Accordingly, the present invention provides for a nuclear reactor core of the kind having substantially vertical channels therein for the reception of fuel elements and adapted for high temperature operation, an enclosing pressure vessel, said vessel being adapted for the flow through said channels of gaseous cooling medium, and a plate-like shield structure incorporating material of high neutron capture cross-section, said shield structure being positioned to lie between the top of said core and the vessel over the upper ends of said channels and substantially to prevent neutrons reaching the upper part of the pressure vessel.

In one embodiment of the invention, the shield structure defines a gas space between it and the upper part of the pressure vessel, and is arranged to be cooled by cooling gas flowing through this space.

The shield structure which will be of, or will include, material of high neutron capture cross-section such as boron, may be formed of a plurality of overlapping plates suitably apertured where necessary for the passage of parts of the reactor, and if the pressure vessel of the reactor is of the nature described in copending application Serial No. 588,406, then the shield structure is preferably placed inside the inner shell or wall of the composite pressure vessel.

Each said plate of the shield structure may be a sandwich of a material of high neutron capture cross-section between plates of material such as mild steel.

The shield structure may be supported in any convenient manner but in one arrangement in accordance with the invention, the shield structure is supported from the bottoms of standpipes of control rod mechanisms.

Figure 2:
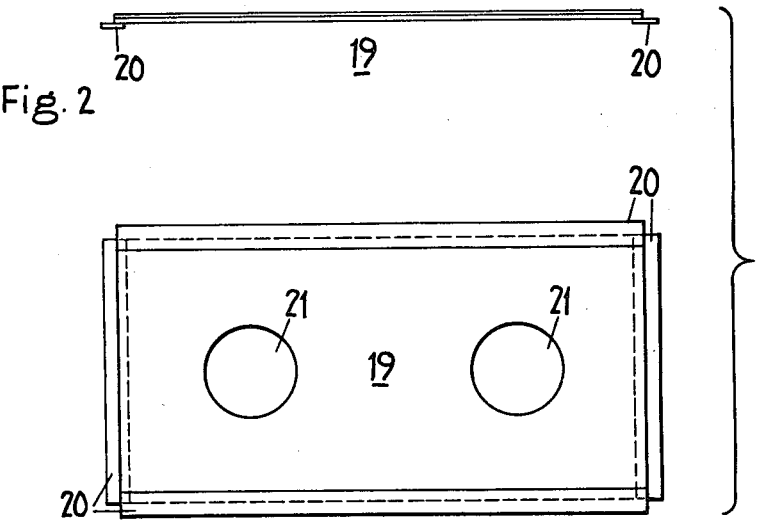

In order that the invention may be clearly understood, one arrangement of a gas cooled nuclear reactor having a composite pressure vessel and embodying a protective shield structure in accordance with the invention will now be described by way of example with reference to the accompanying drawings, in which FIGURE 1 is a side elevation, partly in section, of the pressure vessel and its contents, FIGURE 2 is a showing of a typical individual plate member of the protective shield, FIGURE 3 is a fragmentary sectional view of the member shown in FIGURE 2, and FIGURE 4 is a fragmentary plan view of the protective shield structure.

Referring now to FIGURE 1 of the drawings, this figure shows a pressure vessel of the type forming the subject of copending patent application Serial No. 588,406 referred to above, and essentially the vessel comprises an outer shell 1 and an inner shell 2 which forms a heat resistant lining spaced from the outer shell. The core 3 of the reactor is formed with vertically extending channels for the reception of the fuel elements and for the throughflow of the cooling gas. This core rests upon a supporting grid 4 and the operating gas of the reactor is fed to the core through inlets 5 and passes out from the inner vessel 2 from outlets 6, the gas from the outlets passing to heat exchangers (not shown). The cooling gas flows from the gas inlets 5 downwardly at first and then upwardly through the channels of the core 3, finally being discharged from the top of the core and through the outlets 6. Fuel elements (not shown) are mounted within the channels of the core 3, and during charge and discharge operations the fuel elements are arranged to be fed through nozzles 7 passing through the bottom of the outer shell 1.

As will be seen from the figure, the inner shell 2 is not a complete enclosure as is the outer shell 1 but consists of a vertical cylindrical portion and a more or less hemispherical portion closing the upper end of the cylindrical portion. As will be appreciated by those skilled in the art, the upper part of the composite pressure vessel of the reactor would be subjected in operation to substantial neutron bombardment from the fuel elements in the core and further, there is a temperature gradient from the bottom to the top of the vessel causing the roof of the vessel to run at considerably higher temperatures than the bottom of the vessel. In order to protect the roof or top of the pressure vessel to a maximum extent both as regards neutron bombardment and hot gas impinging thereon a plate-like protective shield structure 8 is disposed above the core 3 over the upper ends of the channels therein, this shield structure being of such a nature that it restricts or limits the flow of neutrons upwardly from the fuel elements in the core 3 towards the roof or top of the pressure vessel.

The shield 8 is shown in the figure as a horizontal partition defining between itself and the top of the inner shell 2 a gas space 9 and a small gap 10 is let between the periphery of the shield 8 and the inner surface of the inner shell 2. Actually, a shielding 11 of mild steel plates protects the inside of the curved top of the inner shell at the level where the outlets 6 pass out of the pressure vessel and this shielding extends through the gap 10 for a short distance. The shield 8, because of its plate-like structure, is easy to support in the upper part of the pressure vessel, and more important, it is capable of withstanding the high temperatures without buckling.

Referring now also to FIGURE 4, the shield 8 is supported by standpipes 12 for control rod mechanisms (not shown); these standpipes 12 project downwardly through the upper concrete biological shield of the reactor and are suitably sealed by caps 13 in the outer shell 1 of the pressure vessel. Where the standpipes 12 pass through the inner shell 2, means 14 are provided to allow relative movement between the standpipes and the inner shell 2 and further, cooling gas may flow from the space 15 between the two shells into the space 9 above the shield 8. This cooling gas is arranged to be supplied to a ring main 16 and thence by pipes 17 of an internal gas distribution system, which pipes 17 are provided with jets directed on the inside surface of the outer shell 1.

In order to support the shield 8 upon the lower ends of the standpipes 12, the ends of the standpipes are provided with external threads and the shield 8 which is made, as will be described hereinafter, from a plurality of plate members 19, has apertures which are threaded over the ends of the standpipes 12 and are held in place between threaded rings 18 on the standpipes. It will be seen from FIGURE 1 that the shield 8 does not extend radially outward as far as the outermost control rod standpipe 12 but it will be appreciated that the shield 8 covers effectively all the fuel elements within the core 3.

As mentioned above, the shield 8 is made from a plurality of plate members and referring now to FIGURES 2 and 3 which show a typical plate member, the member 19 consists of a sandwich having backing strips 20 either above or below its main plane so as to be capable of overlapping or co-operating with adjacent plate members. The plate member 19 is provided with apertures 21 for the standpipes as shown in FIGURE 1 and the sandwich consists of a layer of boron-containing material spaced between mild steel sheets. The member 19 in the arrangement being described is approximately 5½ feet long by 2¾ feet wide and is ½ inch thick, the upper mild steel plate being ⅛ inch thick, the lower steel plate being ¼ inch thick and there being an ⅛ inch layer of boron-containing material sandwiched between the two plates.

As will be appreciated, the plate members will differ in outline and as regards their backing strips 20 across the shield structure 8, but together they form an effective neutron shield limiting the flow of neutrons upwardly in the pressure vessel. This limits the rise of temperature at the top of the vessel and protects the upper part of the vessel from damage due to the combined action of hot gas streams and neutron beams which would otherwise impinge upon localised areas of the vessel.

The mild steel shielding 11 for the part of the inner shell 2 not protected by the shield 8 may also be formed of plate-like members whose shape will be determined by their location and the members will be secured to the inner shell head by shouldered studs welded to the members and passing with a slight clearance through the holes in the inner shell head.

We claim:

1. In combination with a nuclear reactor core of the kind having substantially vertical channels therein for the reception of fuel elements and adapted for high temperature operation, an enclosing pressure vessel having a top directly above the upper ends of said channels, said vessel being adapted for the flow through said channels of gaseous cooling medium, a plurality of standpipe means secured to said enclosing vessel, each adapted to provide access to said core and extending within said vessel, and a plurality of plate members incorporating material of high neutron capture cross-section, said members being supported in overlapping fashion by some at least of said standpipe means to lie between and spaced from the top of said core and from the top of the vessel over the upper ends of said channels and substantially to prevent neutrons reaching said top of the enclosing vessel.

2. A combination as claimed in claim 1, wherein said members each comprise a thin sandwich of a material of high neutron capture cross-section between plates of material of lower neutron capture cross-section.

3. A combination as claimed in claim 1, wherein the ends of said standpipe means are externally threaded and project through apertures in said members, said members being held in place between internally threaded rings carried by said standpipe means.

4. A combination as set forth in claim 1 wherein the enclosing pressure vessel is constructed in the form of two shells one within the other, the inner of said shells forming a thermal shield for the outer shell, and wherein the plate members are positioned between and spaced from the top of the core and the top of said inner shell.

References Cited in the file of this patent

UNITED STATES PATENTS

| 2,727,996 | Rockwell et al. | Dec. 20, 1955 |
| 2,807,727 | Fermi et al. | Sept. 24, 1957 |
| 2,840,522 | Young et al. | June 24, 1958 |
| 2,863,815 | Moore et al. | Dec. 9, 1958 |
| 2,938,784 | Spedding et al. | May 31, 1960 |
| 2,997,435 | Millar et al. | Aug. 22, 1961 |
| 3,016,462 | Hendrickson et al. | Jan. 9, 1962 |
| 3,016,463 | Needham | Jan. 9, 1962 |

FOREIGN PATENTS

| 751,700 | Great Britain | July 4, 1956 |